United States Patent [19]

Ogura et al.

[11] Patent Number: 4,876,675
[45] Date of Patent: Oct. 24, 1989

[54] TOWED PIEZOELECTRIC CABLE

[75] Inventors: Kohji Ogura, Ohgaki; Kasumi Ogawa, Kagamihara, both of Japan

[73] Assignee: NGK Spark Plug Co., Ltd., Japan

[21] Appl. No.: 241,308

[22] Filed: Sep. 7, 1988

[30] Foreign Application Priority Data

Sep. 12, 1987 [JP] Japan .................................. 62-228941
Nov. 9, 1987 [JP] Japan .................................. 62-283816
Nov. 12, 1987 [JP] Japan .................................. 62-287008

[51] Int. Cl.⁴ .................................................. G01V 1/38
[52] U.S. Cl. .................................. 367/155; 367/165; 367/169; 367/166; 310/337; 310/800
[58] Field of Search ............... 367/130, 153, 154, 155, 367/157, 159, 160, 161, 162, 164, 165, 166, 171, 176, 169, 140; 310/330, 331, 332, 337, 338, 369, 800

[56] References Cited

U.S. PATENT DOCUMENTS

| | | | |
|---|---|---|---|
| 3,320,581 | 5/1967 | Sims | 367/157 |
| 3,480,907 | 11/1969 | King | 367/154 |
| 3,798,474 | 3/1974 | Cassand | 367/155 |
| 3,860,899 | 1/1975 | Watlington | 367/154 |
| 3,890,591 | 6/1975 | Bocquillon et al. | 367/155 |
| 3,900,543 | 8/1975 | Davis | 367/154 |
| 4,183,010 | 1/1980 | Miller | 367/154 |
| 4,651,044 | 3/1987 | Kompanek | 310/323 |
| 4,695,988 | 9/1987 | Banno | 367/154 |
| 4,733,379 | 3/1988 | Lapetina et al. | 367/20 X |

Primary Examiner—Brian S. Steinberger
Attorney, Agent, or Firm—Larson and Taylor

[57] ABSTRACT

A towed piezoelectric cable having a plurality of receiver element units which are arranged on a nonshrinking flexible core with leaving a buffer zone therebetween, each of said receiver element units having two piezoelectric elements which are polarized in a predetermined direction, and are provided with inner electrodes connected to each other and outer electrodes between which an output signal is produced, respectively, the assembly of said receiver element units and said flexible core being contained in a flexible tube which is filled with an insulating oil.

22 Claims, 10 Drawing Sheets

TOWED PIEZOELECTRIC CABLE

FIELD OF THE INVENTION

This invention relates to a towed piezoelectric cable intended to be towed by a marine research ship or an oceanographic vessel for determining acoustic waves or pressures produced in an underwater. The towed piezoelectric cable may conveniently be utilized for a submarine earthquake searching or fish finding.

BACKGROUND OF THE INVENTION

It is known that sinterable piezoelectric ceramic material and piezoelectric composite material may be used for such towed piezoelectric cable.

Generally, piezoelectric ceramic-polymer composite can be produced by mixing ferroelectric ceramic particles of lead zirco-titanate or lead titanate with piezoelectric organic material such as polyvinylidene fluoride, polyvinyl fluoride, polyvinylidene chloride, polyvinyl chloride or nylon, or organic material such as synthetic rubber or synthetic resin, and has acoustic impedance characteristics similar to that of water.

It is also known that when such a piezoelectric ceramic-polymer composite material is used for a piezoelectric cable, it can efficiently receive acoustic waves being propagated under water to provide advantages of increasing the sensitivity.

U.S. Pat. No. 3,860,899 discloses a towed hydrophone system for sensing acoustic signals in which it comprises a towed cable, a hydrophone housing secured at one end of the towed cable and filled with a viscous fluid, and a hydrophone positioned axially in the housing by an axially extending conductive connector.

U.S. Pat. No. 3,798,474 discloses a piezoelectric sensor system which comprises at least one element of flexible material having piezoelectric properties and two faces, each associated with an electrode. This U.S. Pat. No. 3,798,474 also discloses a sensor of a coaxial shape comprising a sensitive piezoelectric element having two cylindrical electrodes placed respectively inwardly and outwardly with respect to the piezoelectric element, a center core of flexible insulating material for supporting the assembly, and a flexible insulating sheath.

Further, U.S. Pat. No. 4,183,010 discloses a coaxial piezoelectric cable comprising radially spaced conductors, intermediate dielectric material having piezoelectric properties, and an outer jacket.

With the conventional arrangement as mentioned above, the piezoelectric cable is subjected to not only acoustic waves but also a tensile stress or a bending stress due to nodding when it is towed. By these mechanical pressures there may be produced some distortion in the piezoelectric element to induce an electric charge or voltage which produces a noise signal to be superposed on the acoustic waves, thereby decreasing the S/N ratio.

Further, when the piezoelectric cable is towed, there may occur a cavitation or turbulence around the cable which produces an undesired signal called a flow noise. In case the piezoelectric element assemblies are disposed with leaving a larger space therebetween, said flow noise can not be satisfactorily suppressed.

Furthermore, when the coaxial cable is subjected to a force in a direction perpendicular to the axis thereof, it may be deformed to have the depressed portion and the protruded portion which are different from each other in area. Therefore, the produced noise signals can not be cancelled to each other. Also, for the axial tensile stress a noise signal may be introduced into an acoustic signal to be determined.

In the prior art as mentioned above, the influence of the various mechanical pressures which act on the piezoelectric cable can not fully eliminated, so that some noise signals are necessarily introduced into the measured acoustic signal and thus a high S/N ratio can not be obtained.

SUMMARY OF THE INVENTION

It is, therefore, an object of this invention to provide a towed piezoelectric cable capable of eliminating the abovementioned drawbacks or disadvantages of the conventional piezoelectric cables and obviating the influence of the mechanical pressures.

A further object of the invention is to provide a towed piezoelectric cable capable of eliminating the influence of any external wave motion thereupon.

According to one aspect of this invention, there is provided a towed piezoelectric cable comprising a plurality of receiver units, each of said receiver units having piezoelectric element layers which are polarized in a direction of the thickness and arranged so that the piezoelectric element layers have same polarizing direction and a conductive connecting member on the both surfaces of which said piezoelectric element layers are provided, said each piezoelectric element layer being provided with an inner electrode and an outer electrode, and the inner electrodes of the piezoelectric element layers in said each piezoelectric receiver unit are shortcircuited through said connecting member; a non-shrinking flexible core disposed to pass through the center of said each receiver unit for supporting said receiver units with leaving a buffer zone between the adjacent receiver units; means connected to said each receiver unit for producing a potential induced between the outer electrodes of said piezoelectric element layers; and a flexible tube for containing the assembly of said receiver units and said flexible core, said flexible tube being filled with an insulating oil.

Preferably said each piezoelectric element layer may be made of a sinterable piezoelectric ceramic material or a piezoelectric composite material.

Suitably said each receiver unit may be constructed by adhering two piezoelectric element layers polarized in a direction of the thickness on the both surfaces of the connecting member of metal in such a way that the piezoelectric element layers have same polarization direction.

Preferably said each piezoelectric element layer may be made of a piezoelectric ceramic-polymer composite material, and said connecting member may be made of an electroconductive composite material.

Preferably the piezoelectric ceramic-polymer composite material used for the piezoelectric element layers comprises piezoelectric rubber which is produced by dispersing piezoelectric powder into synthetic rubber, and the electroconductive composite material for the connecting member is produced by dispersing metal powder into synthetic rubber.

Alternatively the piezoelectric ceramic-polymer composite material for the piezoelectric element layers may be produced by dispersing piezoelectric powder into synthetic resin, and the electroconductive composite material for the connecting member may be produced by dispersing metal powder into synthetic resin.

According to a second aspect of this invention, there is provided a towed piezoelectric cable comprising a plurality of receiver units, each of said receiver units including two piezoelectric elements which are polarized in a predetermined direction and a connecting member disposed between said piezoelectric elements for connecting them, said each piezoelectric element being provided with a first pole having one polarity and a second pole having opposite polarity, and said first pole of one of said piezoelectric elements being connected to the second pole of the other piezoelectric element; a nonshrinking flexible core disposed to pass through the center of said each receiver unit for supporting said receiver units with leaving a buffer zone between the adjacent receiver units; means connected to said each receiver unit for producing a potential induced between the second pole of said one piezoelectric element and the first pole of said other piezoelectric element; a flexible tube for containing the assembly of said receiver units and said flexible core, said flexible tube being filled with an insulating oil; and means for bridging the inner surface of said flexible tube and said flexible core.

Preferably said two piezoelectric elements polarized in a predetermined direction may be adhered to the both surfaces of the connecting member which is fixed to the flexible core in such a way that the piezoelectric elements have same polarizing direction.

Said connecting member has a peripheral edge portion which may be contacted with the inner surface of said flexible tube and may be intended for bridging the inner surface of said flexible tube and said flexible core. In that case, the insulating oil may be trapped between the respective connecting members.

Said each piezoelectric receiver unit may comprise two cylindrical piezoelectric elements which are radially polarized, have different polarizing direction and which are coaxially disposed to be adhered to the both surfaces of an insulating plate interposed therebetween and fixed to the flexible core, in which each of said cylindrical piezoelectric elements is provided with an inner cylindrical electrode at its inner surface and an outer cylindrical electrode at its outer surface, the inner cylindrical electrode of one of the cylindrical piezoelectric elements being connected to the inner cylindrical electrode of the other cylindrical piezoelectric element via conductive means.

Preferably said flexible tube may be a heat-shrinkable tube.

According to a third aspect of this invention, there is provided a towed piezoelectric cable comprising a plurality of receiver units, each of said receiver units including two piezoelectric elements which are polarized in a predetermined direction and a connecting member disposed between said piezoelectric elements for connecting them, said each piezoelectric element being provided with a first pole having one polarity and a second pole having opposite polarity, and said first pole of one of said piezoelectric elements being connected to the second pole of the other piezoelectric element; a nonshrinking flexible core disposed to pass through the center of said each receiver unit for supporting said receiver units with leaving a buffer zone between the adjacent receiver units; means connected to said each receiver unit for producing a potential induced between the second pole of said one piezoelectric element and the first pole of said other piezoelectric element; a flexible tube for containing the assembly of said receiver units and said flexible core, said flexible tube being filled with an insulating oil; and buffer means each having an outer peripheral portion contacted With the inner surface of said flexible tube and a center portion fixed to said flexible core.

Preferably said each buffer means may comprise an elastic plate which is provided with a bearing at the center portion and a retaining ring at the outer peripheral portion, the bearing being intended to engage with the flexible core and the retaining ring being contacted with the inner surface of said flexible tube.

In the piezoelectric cable according to the third aspect of this invention, each piezoelectric element may be circular, polarized in a direction of the thickness and adhered on the both surfaces of the connecting member of metal in such a way that the piezoelectric element layers have same polarization direction.

Also, each piezoelectric receiver unit may be comprise two cylindrical piezoelectric elements which are radially polarized, have different polarizing direction and which are coaxially disposed to be adhered to the both surfaces of an insulating plate interposed therebetween and fixed to the flexible core, in which each cylindrical piezoelectric elements is provided with an inner cylindrical electrode at its inner surface and an outer cylindrical electrode at its outer surface, and the inner cylindrical electrode of one of the cylindrical piezoelectric elements is connected to the inner cylindrical electrode of the other cylindrical piezoelectric element via conductive means.

These and other objects and advantages of this invention will become more apparent and fully understood from the following description in conjunction with the accompanying drawings.

DETAILED DESCRIPTION

Figure 1:
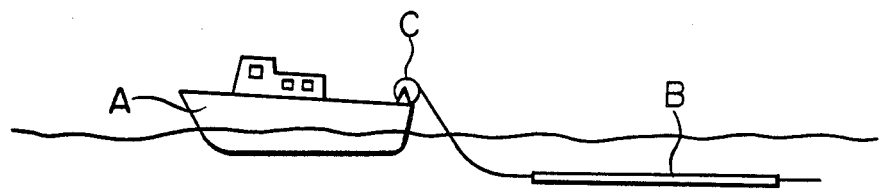
FIG. 1 is a schematic view showing a piezoelectric cable being towed in an underwater.

Referring now to the drawings, FIG. 1 shows a ship A from which a towed piezoelectric cable B trails in an underwater for a submarine earthquake searching or fish finding. The towed piezoelectric cable B is connected with a winch C provided on a stern of the ship A at the one end thereof, and upon the operation is intended to be drawn out from the winch C and towed in an underwater.

Figure 2:
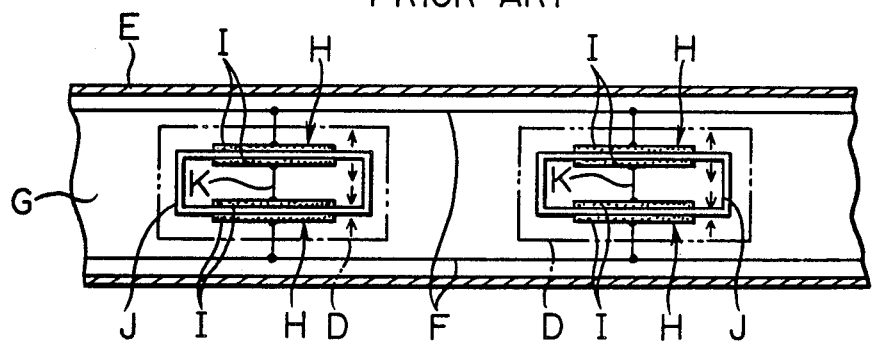
FIG. 2 is a sectional view showing a conventional piezoelectric cable.

FIG. 2 shows a conventional piezoelectric cable made of the sinterable piezoelectric ceramic material, in which piezoelectric receiver units D are disposed in a flexible tube E, each piezoelectric receiver units D is spaced from the others and is connected to conductors F, and the flexible tube E is filled with oil G having an acoustic characteristic which is approximate to an acoustic impedance of water prevailed in the flexible tube E.

Each piezoelectric receiver unit D comprises two piezoelectric sheet assemblies H and H which are disposed in a direction perpendicular to the axis of the tube E, each piezoelectric sheet assembly H is formed of two piezoelectric ceramic sheets I of ferroelectric material such as lead zirco-titanate or lead titanate which are arranged to be opposite to each other and polarized to opposite direction, and the piezoelectric ceramic sheets I are shortcircuited through a closed conductor circuit J which is interposed therebetween. In this case, for example, the opposed electrodes in the upper piezoelectric sheet assembly H may be polarized to become negative while the opposed electrodes in the lower piezoelectric sheet assembly H may be polarized to become positive. As a result, each piezoelectric assembly H has a polarizing direction as shown by arrows in FIG. 2. The inner electrodes in the respective piezoelectric sheet assemblies H are connected to each other via a conductor K, and the outer electrodes in the respective piezoelectric sheet assemblies H are connected to the conductors F from which a detected acoustic signal may be delivered.

In the conventional arrangement, the noise signal may be cancelled in accordance with a following principle.

Figure 3A:
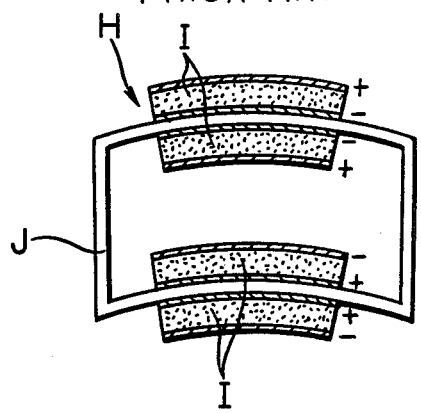
FIGS. 3A and 3B are respectively a schematic view and an equivalent circuit diagram of a piezoelectric receiver unit in the cable of FIG. 2 when it is subjected to a bending stress.
Figure 3B:
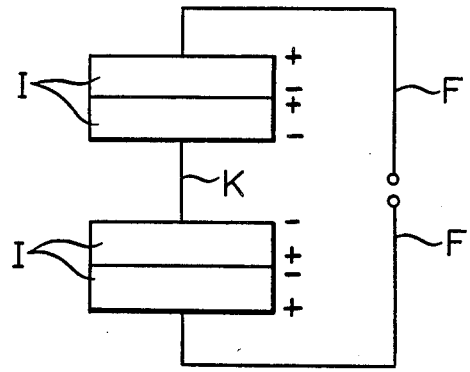

When the piezoelectric cable is subjected to a force perpendicular to the axis, as shown in FIG. 3, bending distortions of the same direction may occur in the upper and lower piezoelectric sheet assemblies H and thus electric charges may be generated between the electrodes in the respective piezoelectric sheet assemblies H. The electric charge thus generated between the electrodes in the upper piezoelectric sheet assembly H is in its absolute value equal to but in its polarity different from that in the lower piezoelectric sheet assembly H, and therefore these charges may be cancelled to each other. No output signal can be produced on the conductors F.

Any distortions to be produced by the axial tensile stress may also be cancelled in the same way.

Figure 4A:
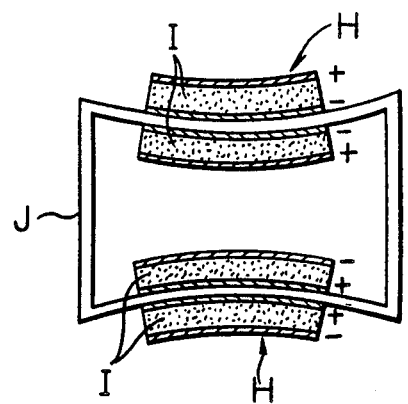
FIGS. 4A and 4B are respectively a schematic view and an equivalent circuit diagram of the piezoelectric receiver unit in the cable of FIG. 2 being subjected to a force in a direction perpendicular to the axis of the cable.
Figure 4B:
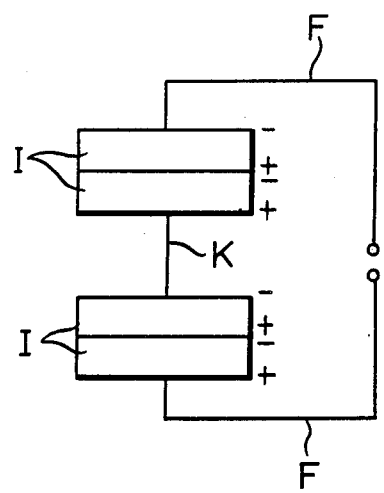

When the piezoelectric cable is subjected to the acoustic waves, as shown in FIG. 4, bending distortions of the opposite direction may occur in the upper and lower piezoelectric sheet assemblies H because the acoustic waves act on the whole outer surface of the cable. Therefore, between the electrodes in the respective piezoelectric sheet assemblies H there may be produced electric charges having same polarity, and then an output signal can be effectively generated on the conductors F.

Figure 5:
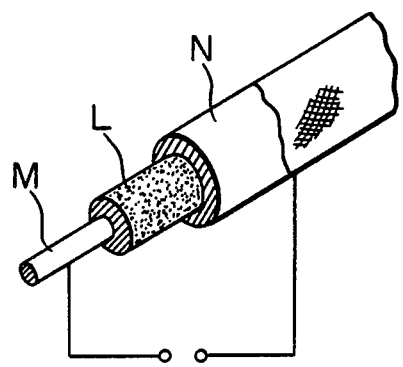
FIG. 5 is a fragmentary cut away perspective view of a coaxial piezoelectric cable of another conventional type.

FIG. 5 shows an example of a conventional coaxial piezoelectric cable using the piezoelectric ceramic-polymer composite material in which a piezoelectric layer L made of the piezoelectric material is disposed around an electrode core M, is provided with an electroconductive layer N of an electroconductive paint or the like on the outer surface thereof, and is radially polarized by applying a predetermined DC voltage between the electrode core M and the electroconductive layer N. The coaxial piezoelectric cable thus formed is dipped into water for receiving acoustic waves being propagated under water, thereby generating an output signal between the electrode core M and the electroconductive layer N.

In this system, when the cable is subjected to the bending stress, it may be deformed so that the expanded section and the contracted section have substantially equal area, and electrical charges of the different polarity are thus produced in the respective polarized portion to be cancelled from each other.

Figure 6:
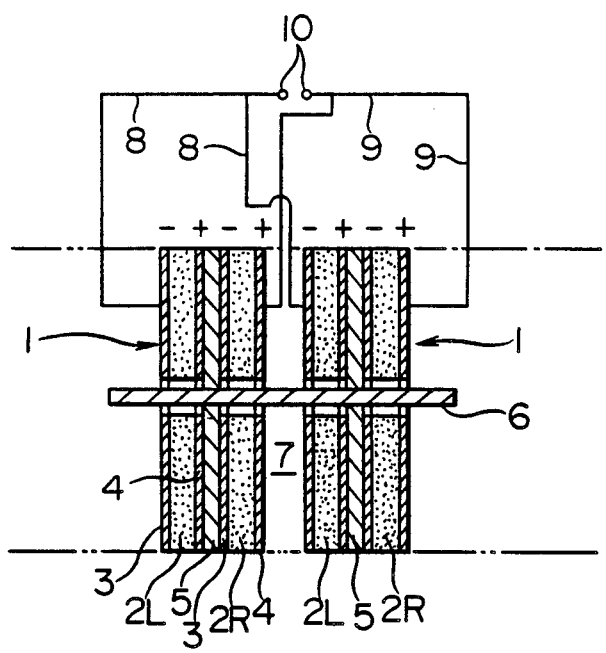
FIG. 6 is a schematic sectional view showing piezoelectric receiver units for use in a towed piezoelectric cable according to this invention.
Figure 7:
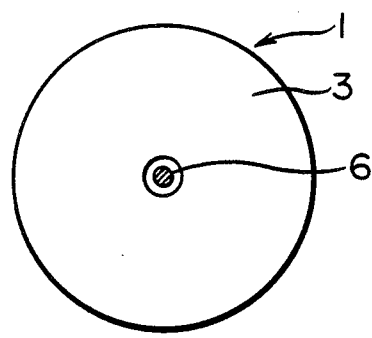
FIG. 7 is a plan view of the piezoelectric receiver units of FIG. 6.

In FIGS. 6 and 7, there is shown piezoelectric receiver units which may be used for a towed piezoelectric cable according to this invention, generally referred to by the numeral 1. Each piezoelectric receiver unit 1 includes two piezoelectric element layers 2L and 2R of disc shape which are polarized in a direction of the thickness, and each of which is provided with electrodes 3 and 4 on the surfaces. The piezoelectric element layers 2L and 2R are disposed on and then connected with the both surfaces of a circular electroconductive connecting plate 5 in such a way that they have same polarization direction. Thus the inner positioned electrodes of the piezoelectric element layers 2L and 2R are shortcircuited through the connecting plate 5. The piezoelectric receiver units 1 thus assembled are mounted on a nonshrinking flexible core 6 by fixing the center portion of the connecting plate 5 thereon with leaving a buffer zone or a space 7 between the adjacent receiver units 1. The outer positioned electrodes of the piezoelectric element layers 2L and 2R in each unit 1 are connected through conductors 8 and 9 to output terminals 10.

Each piezoelectric element layer may be made of a sinterable piezoelectric ceramic material or a piezoelectric composite material.

Figure 8A:
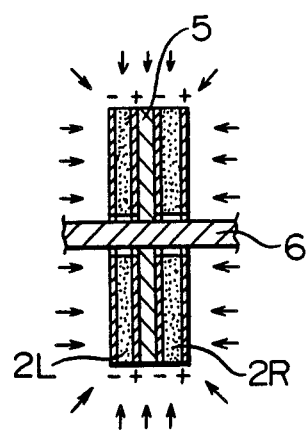
FIGS. 8A and 8B are respectively a schematic sectional view and an equivalent circuit diagram of the piezoelectric receiver unit shown in FIG. 6 being subjected to pressures.
Figure 8B:
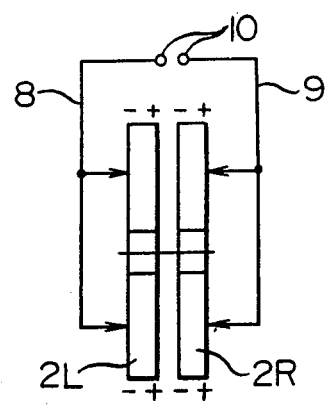

In the operation of the piezoelectric receiver units 1, each piezoelectric receiver unit 1 is subjected to acoustic waves over its entire outer surface as shown by arrows in FIG. 8A, and then a voltage is induced in the outer electrode of the each piezoelectric element layer. The voltages thus induced in the respective outer electrodes appear on the output terminals 10 via the conductors 8 and 9 as shown in FIG. 8B.

Figure 9A:
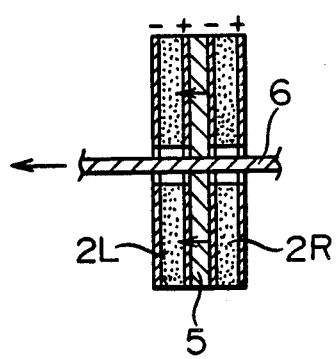
FIGS. 9A, 9B and 9C are respectively a schematic sectional view, an equivalent circuit and a dynamical model of the piezoelectric receiver unit shown in FIG. 6 to which an axial force is applied.
Figure 9B:
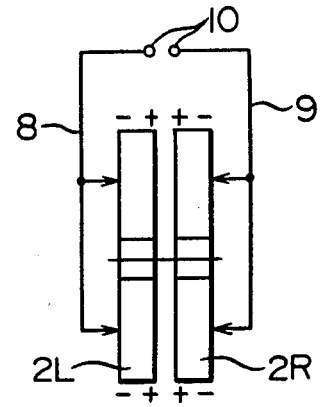
Figure 9C:
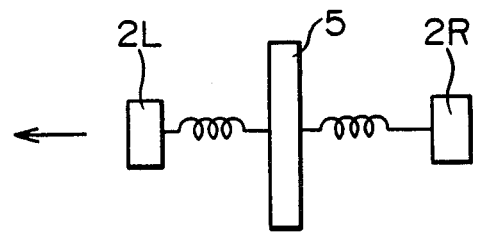

It is now assumed that the piezoelectric receiver units 1 are subjected to an axial tensile force through the core 6 as shown in FIG. 9A. If the connecting plate 5 in each unit 1 has a higher rigidity, the left-hand piezoelectric element layer 2L is pushed to be compressed in a direction of the thickness or an axial direction by the inertia force of the connecting plate 5, while right-hand piezoelectric element layer 2R is pulled to be expanded in a direction of the thickness or an axial direction by the inertia force of the connecting plate 5 as shown by the dynamical model in FIG. 9C. As a result, the charges induced in the piezoelectric element layers 2L and 2R are opposite in polarity, and thus the outer electrodes in the piezoelectric element layers 2L and 2R become same polarity or negative as shown in FIG. 9B. Therefore, no potential is produced.

If the connecting plate 5 in each unit 1 is of flexible, the piezoelectric element layers 2L and 2R are bent in the axial direction by the inertia force of the connecting plate 5 in correspondence with the deformation thereof, but due to the bending the left hand layer 2L is to be compressed and the right hand layer 2R is to be expanded in the axial direction, and thus no potential is produced.

Figure 10A:
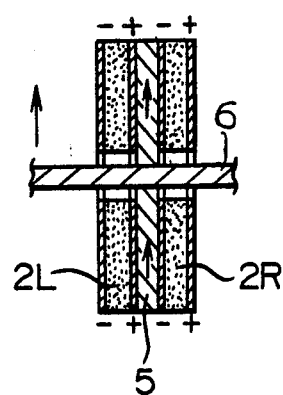
FIGS. 10A, 10B and 10C are respectively views similar to FIGS. 9A, 9B and 9C showing the operation when the piezoelectric receiver unit is subjected to a radial force.
Figure 10B:
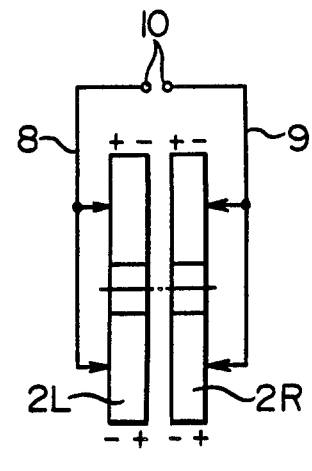
Figure 10C:
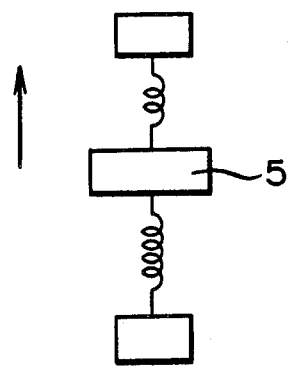

It is assumed that the piezoelectric receiver units 1 are subjected to a traverse force in a direction perpendicular to the axis through the core 6 as shown in FIG. 10A. As shown by the dynamical model in FIG. 10C, the portion of the piezoelectric element layers 2L and 2R above the core 6 is compressed in a radial direction by the inertia force of the connecting plate 5, while the lower portion of the piezoelectric element layers 2L and 2R below the core 6 is expanded in a radial direction. As a result, the charges induced in the upper and lower portions of the piezoelectric element layers 2L and 2R are opposite in polarity, and thus are cancelled to each other in each of the piezoelectric element layers 2L and 2R as shown in FIG. 10B.

Figure 11:
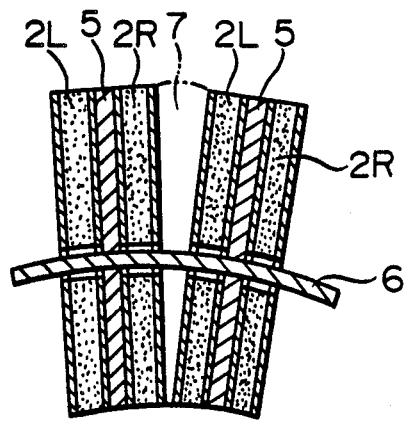
FIG. 11 is a schematic sectional view showing the piezoelectric receiver units being subjected to a bending stress.

Further, it is assumed that the piezoelectric receiver units 1 are subjected to a bending force through the core 6. As shown in FIG. 11, the piezoelectric receiver units 1 are relatively inclined, but due to the provision of the buffer space 7 therebetween this relative inclination has no influence upon the piezoelectric element layers in each unit 1, no distortion may occur in each piezoelectric element layer, and therefore no noise signal is produced.

Figure 12:
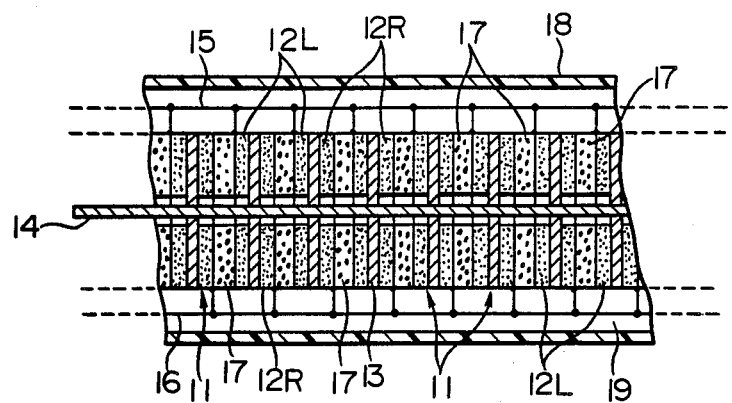
FIG. 12 is a schematic sectional view showing one embodiment of this invention.

FIG. 12 illustrates the towed piezoelectric cable according to one embodiment of this invention.

The illustrated cable includes a plurality of piezoelectric receiver units 11, each receiver unit 11 may be constructed as shown in FIG. 6, that is, it comprises two piezoelectric element layers 12L and 12R of disc shape which are polarized in a direction of the thickness, and each of which is provided with electrodes on the surfaces. The piezoelectric element layers 12L and 12R are adhered to the both surfaces of a circular conductive connecting plate 13 so that they have same polarization direction.

The piezoelectric receiver units 11 are mounted on a nonshrinking flexible core 14 by fixing the center portion of the connecting plate 13 thereon with leaving a space between the adjacent receiver units 11. The outer positioned electrodes of the piezoelectric element layers 12L and 12R in each unit 11 are connected to conductors 15 and 16 which are in turn connected to an output control system, not shown, loaded on a vessel by which the cable may be towed. The piezoelectric element layers 12L and 12R may be formed by punching a piezoelectric composite sheet material. Into each space defined between the adjacent receiver units 11 may be inserted an annular buffer member 17 made of a flexible material such as expanded rubber for maintaining the space between the adjacent piezoelectric element layers while allowing them to relatively incline.

The assembly thus constructed is completed by covering it with a flexible tube 18 and filling the tube 18 with an insulating oil 19 such as silicone oil or the like for preventing the electrodes of the each piezoelectric element layer and the conductors from being shortcircuited.

The completed piezoelectric cable may be towed by connecting the one end of the flexible core 14 with the winch on the stern of the vessel as illustrated in FIG. 1.

When the flexible tube 18 is externally subjected to acoustic waves, as shown in FIGS. 8A and 8B, voltages may be induced in the electrodes of each piezoelectric receiver unit 11 and transmitted to the control system through the conductors 15 and 16. In this connection, if the axial force, or the transverse or radial force acts on the cable, any influence of these forces upon the output signal can be removed by the cancelling principle described with reference to FIGS. 9A-9C and 10A-10C. Also, if the bending force acts on the cable, as described with reference to FIG. 11 the core 14 may be deflected, but each piezoelectric receiver unit 11 may be relatively inclined due to the shrinking of the buffer members 17. Therefore, there is no distortion which induces any charge. Further, since a plurality of piezoelectric receiver units 11 are longitudinally and continuously arranged with a short interval, there can be satisfyingly suppressed any flow noise which may occur upon the towing of the cable.

In the illustrated embodiment, it will be possible to fill the spaces between the respective piezoelectric receiver units 11 with the insulating oil 19 instead of the annular buffer member 17.

Figure 13:
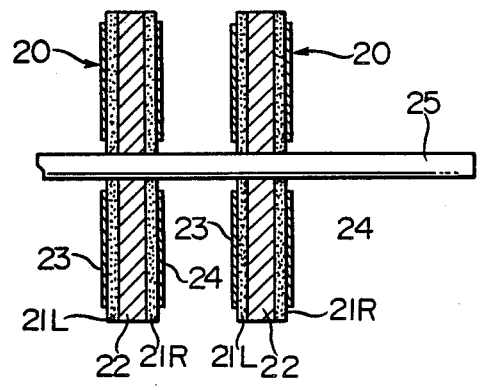
FIG. 13 is a schematic sectional view showing another piezoelectric receiver units which are used in the cable of FIG. 12

FIG. 13 illustrates another embodiment of the piezoelectric receiver units 20 each of which comprises two piezoelectric element layers 21L and 21R provided on the both surfaces of an electroconductive connecting plate 22. Each piezoelectric element layer is formed of a piezoelectric rubber which consists of synthetic rubber and piezoelectric powder material dispersed into the synthetic rubber, and the connecting plate 22 is made of electroconductive composite material which consists of synthetic rubber and metal powder dispersed into the synthetic rubber.

It will now be described how the piezoelectric receiver unit may be produced.

Figure 14:
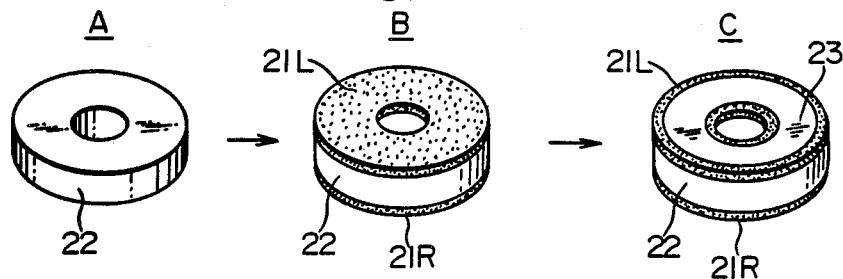
FIG. 14 is a schematic perspective view showing how each of the piezoelectric receiver units of FIG. 13 is manufactured.

In order to form the connecting plate 22, the electroconductive composite material is formed into a torus as shown in FIG. 14A. Then, as shown in FIG. 14B, the side surfaces of the torus are coated with composite material of synthetic rubber and PZT (PbZrO$_3$—PbTiO$_3$ type) powder resolved in solvent, toluene by using a screen printing or the like to form the piezoelectric element layers 21L and 21R. The piezoelectric element layers 21L and 21R thus formed are semi-vulcanized and then coated with composite material of synthetic rubber and metal powder of silver or other metal resolved in toluene at the surfaces to form annular outer electrodes 23 and 24. The assembly thus formed is then vulcanized and polarized to complete each unit 20 as shown in FIG. 14C. The piezoelectric receiver units thus constructed are mounted on a flexible core 25 and fixed thereon with a suitable space.

Since each component emploies synthetic rubber for a base material, vulcanization can be performed simultaneously for the respective elements, and thus each piezoelectric receiver unit can be integrally formed without bonding operation. Also, in this arrangement, each connecting plate 22 serves also as inner electrodes for the piezoelectric element layers 21L and 21R.

Alternatively, the piezoelectric receiver unit 20 may be manufactured by preparing a sheet provided with material layers corresponding to said respective components, vulcanizing it, and punching the vulcanized sheet in the form as shown in FIG. 14C.

It will be appreciated that instead of the synthetic rubber synthetic resin may be used as a base material for the piezoelectric element layers 21L and 21R, the conductive connecting plate 22 and the electrodes 23 and 24. In this case, it is also possible to integrally form the respective piezoelectric receiver unit by using a forming under heat or the like.

Figure 15:
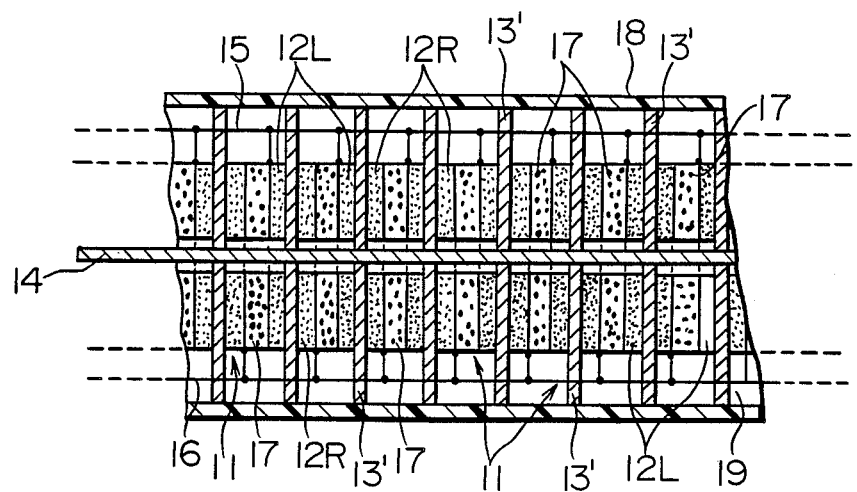
FIG. 15 is a schematic sectional view showing another embodiment of this invention.

FIG. 15 shows another embodiment of the piezoelectric cable of this invention. The illustrated cable includes piezoelectric receiver units each having substantially the same construction as that shown in FIG. 12 except a circular connecting plate interposed between the piezoelectric element layers. Therefore, the same reference numerals as those in FIG. 12 designate the same or equivalent components. In this embodiment each connecting plate 13' in each piezoelectric receiver unit 11 is extended so that the outer edge thereof is contacted with the inner surface of the flexible tube 18. Therefore, the respective connecting plates 13' is intended to prevent the piezoelectric elements from being directly subjected to any external force.

With the arrangement shown in FIG. 15, since each connecting plate 13' has no opening through which allows the filled oil 19 to pass, the filled oil 19 is trapped between the respective connecting plates 13' so that it does not flow longitudinally through the flexible tube 18, and thus no flow noise can be caused by the filled oil 19.

Figure 16:
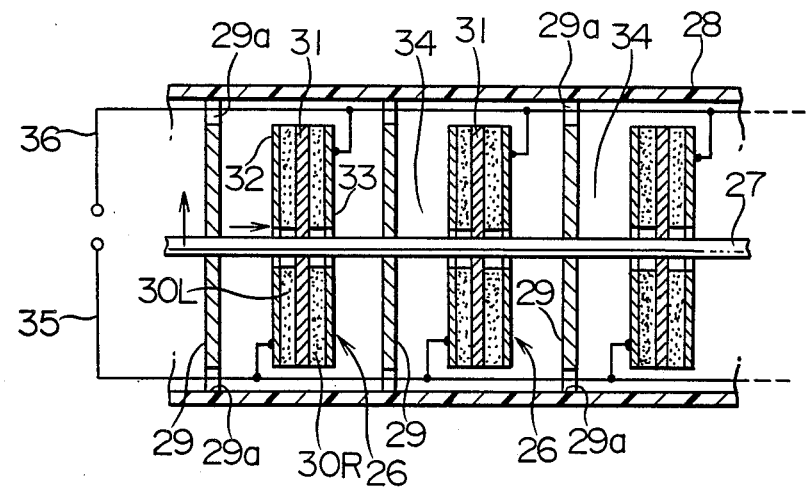
FIG. 16 is a schematic sectional view showing a further embodiment of this invention.

FIG. 16 illustrates the towed piezoelectric cable according to a further embodiment of this invention.

The illustrated cable includes a plurality of piezoelectric receiver units 26, a nonshrinking flexible core 27 for coaxially supporting the piezoelectric receiver units 26, a flexible tube 28 for enclosing the piezoelectric receiver units 26 and the flexible core 27, and circular retaining members 29 which are positioned between the respective piezoelectric receiver units 26

Each piezoelectric receiver unit 26 comprises two piezoelectric elements 30L and 30R of disc shape which are polarized in a direction of the thickness, and are adhered to the both surfaces of a circular conductive connecting plate 31 in such a way that they have same polarization direction. Each piezoelectric element is provided with electrodes 32 (or 33) on the outer surface.

The piezoelectric receiver units 26 are coaxially mounted on the flexible core 27 by fixing the center portion of the connecting plate 31 thereon with leaving a space 34 between the adjacent receiver units 26. Each space 34 serves as a buffer zone to allow the associated piezoelectric receiver units to relatively incline.

The flexible tube 28 is filled with an insulating oil such as silicone oil or the like for preventing the electrodes of the each piezoelectric element and the conductors from being shortcircuited.

The circular retaining members 29 are positioned in the respective buffer zones 34, each of which is fixedly mounted on the flexible core 27 at the center portion and has an outer diameter approximately corresponding to the inner diameter of the flexible tube 28 so that the outer periphery of the each circular retaining member 29 is contacted with the flexible tube 28. Therefore the circular retaining members 29 are intended to prevent the piezoelectric elements from being directly subjected to any external force Also, each retaining member 29 is provided with one or more openings 29a such as holes or notchs through which the insulating oil can flow so that the filling of the oil into the tube 28 can be facilitated.

The outer electrodes 32 and 33 of the piezoelectric elements 30L and 30R in each unit 26 are connected to conductors 35 and 36 which are in turn connected to an output control system, not shown, loaded on a vessel by which the cable may be towed. The conductors 35 and 36 are extended through the openings 29a of the retaining members 29.

The piezoelectric elements 30L and 30R may be formed of piezoelectric rubber sheet which is one of piezoelectric ceramic-polymer materials. Alternatively, the piezoelectric elements 30L and 30R may be formed of sinterable piezoelectric ceramic material.

In this embodiment, the circular retaining members 29 are not necessarily provided in the respective buffer zones 34, but they may be alternately provided.

In the operation of the illustrated cable, when this cable is subjected to an axial tensile force, a transverse force or a bending force through the flexible core 27, this cable may behave substantially in the same manner as described with reference to FIGS. 9, 10 and 11. Any noise signal due to these mechanical forces can effectively be cancelled and thus the influence of the mechanical forces applied to the cable upon the detection of any acoustic wave may be avoided.

Also, as shown by arrows in FIG. 16, when the cable is subjected to an external pressure which may be caused by the waves, the pressure is transmitted to the flexible core 27 through the circular retaining members 29, and then an inertia force acts in the respective piezoelectric elements 30L and 30R via the core 27. In this case, this inertia force acts on the respective piezoelectric elements 30L and 30R axially or longitudinally and (or) in a direction perpendicular to the axis in response to the directional components of the subjected pressure. By the noise cancelling principle for the respective mechanical force as mentioned hereinbefore, therefore, any noise signal which may be produced by the waves can effectively be cancelled.

Figure 17:
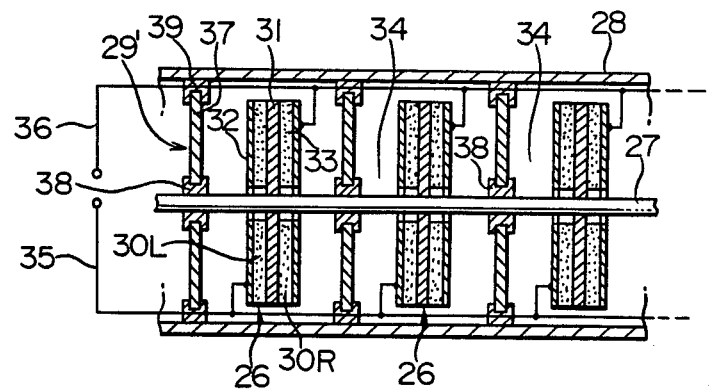
FIG. 17 is a schematic sectional view showing a modification of the embodiment shown in FIG. 16.
Figure 18:
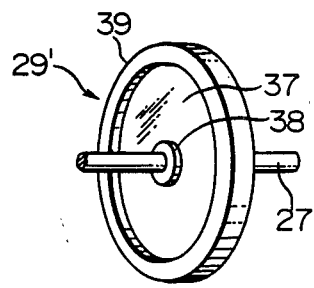
FIG. 18 is a schematic perspective view of the retainer or buffer means in the receiver units shown in FIG. 17 but with a flexible tube being omitted.

FIGS. 17 and 18 show a modification of the embodiment in FIG. 16, in which the same reference numerals as those in FIG. 16 designate the same or equivalent components. The illustrated cable can be constructed in the same manner as in the case of FIG. 16 except for the construction of circular buffer plates 29'.

As shown in FIG. 18, each of the circular buffer plates 29' comprises an elastic annular plate 37 of soft rubber or elastomeric resin or the like, a bearing 38 mounted on the center bore of the elastic annular plate 37 and intended to be fixed to the flexible core 27, and a retainer ring 39 mounted on the outer periphery of the annular plate 37 and intended to be contacted with the inner surface of the flexible tube 28.

The circular buffer plates 29' are provided one in the space between the respective piezoelectric receiver units 26 as shown in the drawing. However, they may be arranged that there are interposed two or more piezoelectric receiver units 26 between the adjacent buffer plates 29' if necessary.

The circular buffer plates 29' are intended to

FIG. 13 illustrates another embodiment of the prevent the filled insulating oil from being moved in the flexible tube 28 upon the towing of the cable. It is, consequently, avoided to produce the dynamic pressure of the insulating oil which may cause the respective piezoelectric element to be distorted. Therefore, the generation of a noise due to the insulating oil can be substantially suppressed.

In order to ensure the tightly contacting of the inner surface of the flexible tube 28 and the outer periphery of the respective buffer plates 29' there may be preferably used a heat-shrinkable tubing for the flexible tube 28. This heat-shrinkable tubing is closed at one end and then filled with the insulating oil. The assembly comprising the piezoelectric receiver units 26, the flexible core 27 and the respective buffer plates 29' is inserted into the tubing. In this connection, since the heat shrinkable tubing has a diameter larger than that of the assemble, the insertion of the latter into the former can be easily performed although the tube has been filled with the insulating oil.

The cable is completed by heating the heat shrinkable tubing to be shrunk so that the inner surface thereof comes tightly into contact with the outer periphery of the respective buffer plate 29'.

Furthermore, each buffer plate 29' may be provided with one or more oil penetrating openings for limitedly passing the insulating oil and the conductors 35 and 36.

In the operation of the illustrated cable, when it is subjected to an external pressure which may be caused by the waves, the pressure is reduced or buffered by the elastic annular plate 37 of the respective buffer plate 29' and is transmitted to the flexible core 27. Due to the reduced vibration an inertia force acts on the respective piezoelectric elements 30L and 30R via the core 27. In this case, this inertia force acts on the respective piezoelectric elements 30L and 30R axially or longitudinally and (or) in a direction perpendicular to the axis in response to the directional components of the subjected pressure. By the noise cancelling principle for the respective mechanical force as mentioned hereinbefore, therefore, any noise signal which may be produced by the waves can effectively be cancelled.

Figure 19:
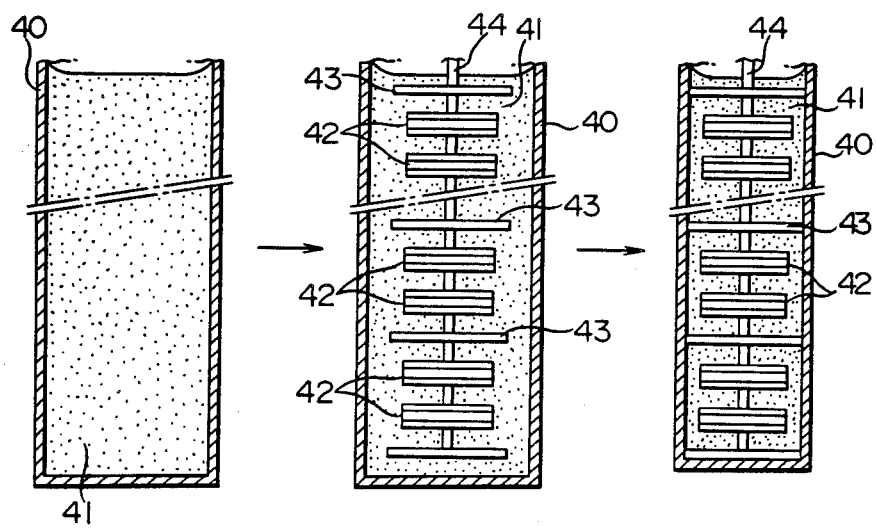
FIG. 19 is a schematic sectional view showing a method of assembling the piezoelectric cable of FIGS. 15, 16 or 17.

By way of example, FIGS. 19 illustrates how the piezoelectric cable may be assemblied.

Firstly, as shown in FIG. 19 A, there is prepared a heat-shrinkable tube 40 having one end closed into which an insulating oil 41 is introduced by using a suitable means. Then, the assembly comprising piezoelectric receiver units 42, buffer or retainer plates 43 and a flexible core 44 as illustrated in FIGS. 15, 16 or 17 is inserted into the tube 40. As shown in FIG. 19-B, since the heat-shrinkable tube 40 has a diameter larger than that of the assembly, the insertion of the latter into the former can be easily performed although the tube has been filled with the insulating oil 41.

The cable is completed by heating the heat-shrinkable tube 40 to be shrunk so that the inner surface thereof comes tightly into contact with the outer periphery of the respective buffer or retainer plates 43.

Figure 20:
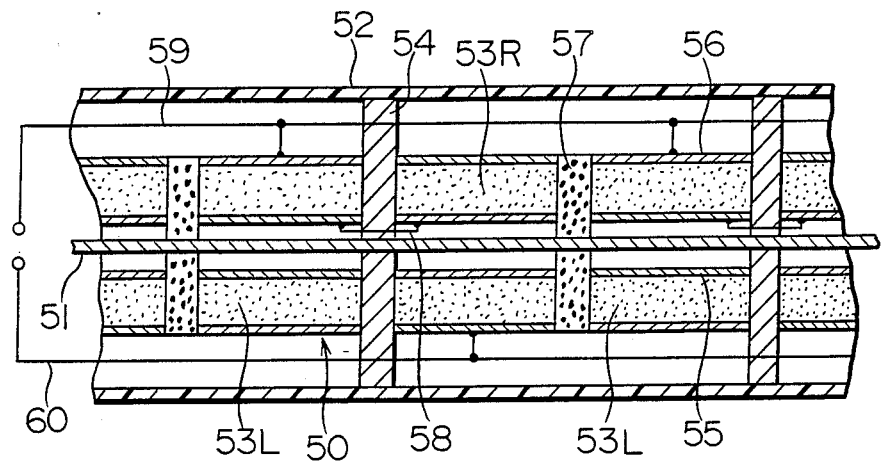
FIG. 20 is a schematic sectional view showing a still further embodiment of this invention.
Figure 21:
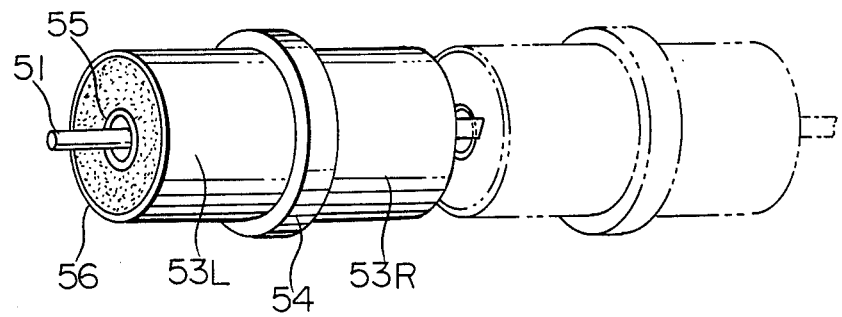
FIG. 21 is a fragmentary perspective view of the piezoelectric receiver units shown in FIG. 20 but with a flexible tube being omitted.

Turning now to FIGS. 20 and 21, a further embodiment of this invention is shown. The illustrated piezoelectric cable comprises a plurality of piezoelectric receiver units 50, a nonshrinking flexible core 51 for coaxially supporting the piezoelectric receiver units 50, and a flexible tube 52 for enclosing the piezoelectric receiver units 50 and the nonshrinking flexible core 51.

Each of the piezoelectric receiver units 50 comprises two cylindrical piezoelectric elements 53L and 53R which are radially polarized and are coaxially adhered to the surfaces of a circular insulator connecting plate 54 in such a way that they have different polarizing direction. Each of the cylindrical piezoelectric elements 53L and 53R has an inner surface provided with an electrode 55 and an outer surface provided with an electrode 56.

The piezoelectric receiver units 50 are coaxially disposed on the flexible core 51 with a suitable buffer space 57 between them, and are fastened on the flexible core 51 by fixing the center bore surface of the connecting plate 54 in the respective unit on the flexible core 51. With the provision of the buffer space 57 between the respective units 50, they may be relatively displaced or inclined to avoid the occurrence of any distortion therein when the cable is exposed to the bending force.

The inner electrodes 55 of the cylindrical piezoelectric elements 53L and 53R in the respective receiver unit 50 are connected to each other by a conductor 58. The outer electrode 56 of the piezoelectric element 53L in the respective receiver unit 50 is connected to a first output conductor 59, and the outer electrode 56 of the piezoelectric element 53R in the respective receiver unit 50 is connected to a second output conductor 60. Between the first and second output conductors 59 and 60 is obtained an output voltage signal which is fed to a control system not shown mounted on the vessel.

The assembly of the receiver units 50 and the flexible core 51 is inserted into a flexible tube 52 and immersed in an insulating oil. In this arrangement, it will be seen that the outer periphery of the respective connecting plate 54 is contacted with the inner surface of the flexible tube 52, with the respective connecting plate 54 serving as means for preventing the piezoelectric elements of the respective receiver unit 50 from being directly subjected to any external force. In this connection, in order to tightly contact the inner surface of the flexible tube 52 with the outer periphery of the respective connecting plate 54, the flexible tube 52 may conveniently comprise a heat shrinkable tubing.

Figure 22A:
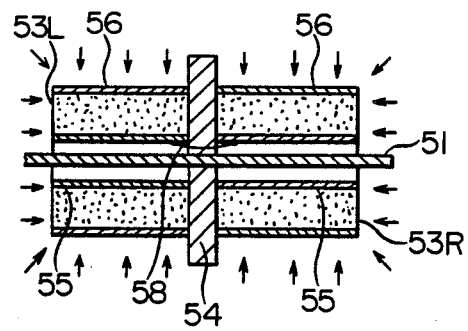
FIGS. 22A and 22B are respectively a schematic sectional view and an equivalent circuit showing the operation of the piezoelectric receiver units shown in FIGS. 20 and 21.
Figure 22B:
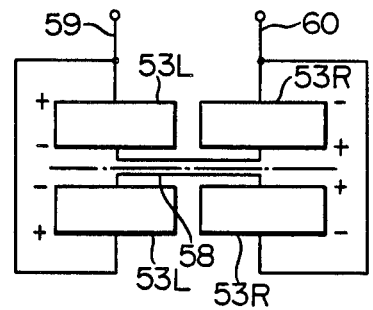

In the operation of the illustrated cable, acoustic waves may act uniformly on the outer surface of the respective receiver unit 50 as shown in FIG. 22A. As a result, as illustrated in FIG. 22B voltages are induced in the outer electrode 56 and inner electrode 55 of the piezoelectric element 53L, and the outer electrode 56 and inner electrode 55 of the piezoelectric element 53R, respectively. The voltages induced in the inner electrodes of the piezoelectric elements 53L and 53R may be cancelled by means of the shortcircuiting through the conductor 58, and the voltages induced in the outer electrodes of the piezoelectric elements 53L and 53R may appear on one output conductor 59 and the other output conductor 60, respectively. Therefore, the sum of the these voltages can be obtained between the output conductors 59 ad 60.

For the mechanical pressures which may act on the cable may be applied the same noise cancelling principle as described with reference to FIGS. 9, 10, 11 and 16. Therefore, noise signals based on the various mechanical pressures other than the acoustic waves can be effectively eliminated so that only the acoustic waves are correctly determined.

Furthermore, it will be appreciated that with the cable of FIG. 20 the moving of the filled oil within the tube can effectively interrupted by the the respective connecting plate 54 so as not to produce the dynamic pressure of the insulating oil which may cause the respective piezoelectric element to be distorted. Therefore, the generation of a noise due to the insulating oil can be substantially suppressed.

Figure 23:
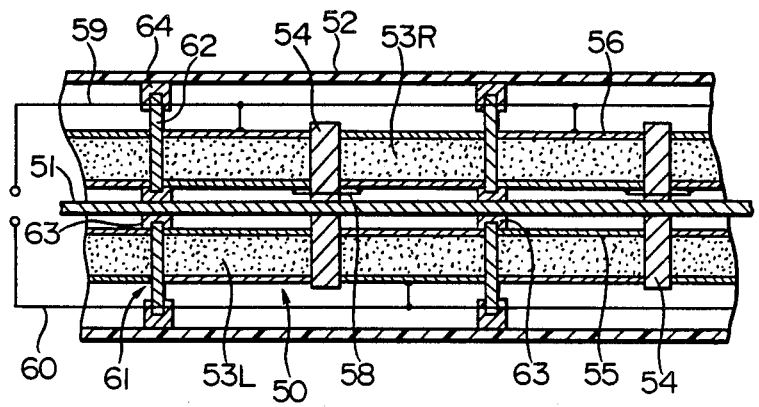
FIG. 23 is a schematic sectional view showing a modification of the embodiment shown in FIG. 20.

FIG. 23 shows a modification of the embodiment in FIGS. 20 and 21, in which the same reference numerals as those in FIGS. 20 and 21 designate the same or equivalent components.

This embodiment is different from that of FIGS. 20 and 21 in that the periphery of the insulator connecting plate 54' in each piezoelectric receiver unit 50 is not contacted with the inner surface of the flexible tube 52, and circular buffer plates 61 are provided between the respective piezoelectric receiver units 50.

Each of the circular buffer plates 61 has substantially the same construction as that of FIG. 18, and comprises an elastic annular plate 62 of soft rubber or elastomeric resin or the like, a bearing 63 mounted on the center bore of the elastic annular plate 62 and intended to be fixed to the flexible core 51, and a retainer ring 64 mounted on the outer periphery of the annular plate 62 and intended to be contacted with the inner surface of the flexible tube 52.

Each circular buffer plate 61 is positioned in the space between the respective piezoelectric receiver units 50 so that the surfaces of the elastic annular plate 62 are abutted on the opposite end surfaces of the adjacent receiver units 50, respectively as shown in the drawing. However, each circular buffer plate 61 may be arranged to leave a space between its respective surface and the end surface of the receiver unit 50 as in the case of FIG. 17 if necessary. Further, it is possible to interpose a flexible member of expanded rubber or the like between the respective buffer plate 61 and the respective piezoelectric receiver unit 50.

The circular buffer plates 61 are intended to prevent the filled insulating oil from being moved in the flexible tube 52 upon the towing of the cable. It is, consequently, avoided to produce the dynamic pressure of the insulating oil which may cause the respective piezoelectric element to be distorted. Therefore, the generation of a noise due to the insulating oil can be substantially suppressed.

According to this invention as described above, by the provision of the piezoelectric receiver units having noise cancellation means, the piezoelectric cable can selectively determine acoustic pressures substantially without any influence of ambient pressures which it may be subjected upon the towing thereof. As a result, the S/N ratio of the output signal can be considerably improved.

Inasmuch as this invention is subject to many variations, modifications and changes in detail, the number of which have been expressly stated herein, it is intended that all matter described throughout this specification or shown in the accompanying drawings be interpreted as illustrative and not in a limiting sense.

What is claimed is:

1. A towed piezoelectric cable comprising a plurality of receiver units, each of said receiver units comprising piezoelectric element layers having a thickness which are polarized in the direction of the thickness of the layers and arranged so that the piezoelectric element layers have the same polarizing direction and a conductive connecting member having a pair of surfaces on which respective ones of said piezoelectric element layers are provided, each said piezoelectric element layer being provided with an inner electrode and an outer electrode, and the inner electrodes of each of said piezoelectric element layers in each said piezoelectric receiver unit being electrically connected together by and thus shortcircuited through said connecting member; a nonshrinking flexible core disposed to pass through the center of said each receiver unit for supporting said receiver units while leaving a buffer zone between adjacent receiver units; means connected to each said receiver unit for producing a potential induced between the outer electrodes of said piezoelectric element layers; and a flexible tube containing the assembly of said receiver units and said flexible core, said flexible tube being filled with an insulating oil.

2. A cable according to claim 1, wherein said each piezoelectric element layer is spaced from the inner surface of said flexible tube.

3. A cable according to claim 1, wherein each said receiver unit comprises two piezoelectric element layers polarized in the direction of the thickness of the layers and adhered on the surfaces of the connecting member so that the piezoelectric element layers have the same polarization direction.

4. A cable according to claim 1, wherein said each piezoelectric element layer comprises a piezoelectric ceramic-polymer composite material polarized in a direction of the thickness, and said connecting member comprises an electroconductive composite material.

5. A cable according to claim 4, wherein the piezoelectric ceramic-polymer composite material of the piezoelectric element layers comprises rubber having piezoelectric properties and comprising synthetic rubber having piezoelectric powder dispersed therein, and the electroconductive composite material for the connecting member comprises synthetic rubber having metal powder dispersed therein.

6. A cable according to claim 4, wherein the piezoelectric ceramic-polymer composite material of the piezoelectric element comprises synthetic resin having piezoelectric powder dispersed therein, and the electroconductive composite material of the connecting member comprises synthetic resin having metal powder dispersed therein.

7. A cable according to claim 1, wherein a buffer member is inserted into said each space between adjacent receiver units.

8. A cable according to claim 1, wherein each said connecting member is in contact with the inner surface of said flexible tube.

9. A towed piezoelectric cable comprising a plurality of receiver units, each of said receiver units including two piezoelectric elements which are polarized in a predetermined direction and a connecting member disposed between said piezoelectric elements for connecting the piezoelectric elements together, said each piezoelectric element being provided with a first pole of one polarity and a second pole of opposite polarity, and said first pole of one of said piezoelectric elements being connected to the second pole of the other piezoelectric element; a nonshrinking flexible core disposed to pass through the center of said each receiver unit for supporting said receiver units while leaving a buffer zone between adjacent receiver units; means connected to said each receiver unit for producing a potential induced between the second pole of said one piezoelectric element and the first pole of said other piezoelectric element; a flexible tube containing the assembly of said receiver units and said flexible core, said flexible tube being filled with an insulating oil; and means for bridging the inner surface of said flexible tube and said flexible core.

10. A cable according to claim 9 wherein said two piezoelectric elements polarized in a predetermined direction are adhered to a respective surface of a pair of surfaces of said connecting member which is fixed to said flexible core so that said piezoelectric elements have the same polarizing direction.

11. A cable according to claim 9 wherein said bridging means include said connecting members each of which is provided with a peripheral edge portion contacted with the inner surface of said flexible tube for bridging the inner surface of said flexible tube and said flexible core.

12. A cable according to claim 11, wherein said insulating oil is trapped between the respective connecting members.

13. A cable according to claim 9 wherein said each piezoelectric receiver unit comprises two cylindrical piezoelectric elements which are radially polarized, which have a different polarizing direction and which are coaxially disposed to be adhered to a respective surface of a pair of surfaces of an insulating plate interposed therebetween and fixed to the flexible core, and each of said cylindrical piezoelectric elements is provided with an inner cylindrical electrode at its inner surface and an outer cylindrical electrode at its outer surface, the inner cylindrical electrode of one of the cylindrical piezoelectric elements being connected to the inner cylindrical electrode of the other cylindrical piezoelectric element via conductive means.

14. A cable according to claim 13 wherein said bridging means include said insulating plates each of which is provided with a peripheral edge portion in contact with the inner surface of said flexible tube for bridging the inner surface of said flexible tube and said flexible core.

15. A cable according to claim 14, wherein said insulating oil is trapped between the respective insulating plates.

16. A cable according to claim 9 wherein said flexible tube is a heat-shrinkable tube.

17. A towed piezoelectric cable comprising a plurality of receiver units, each of said receiver units including two piezoelectric elements which are polarized in a predetermined direction and a connecting member disposed between said piezoelectric elements for connecting the piezoelectric elements together, each said piezoelectric element being provided with a first pole of one polarity and a second pole of opposite polarity, and said first pole of one of said piezoelectric elements being connected to the second pole of the other piezoelectric element; a nonshrinking flexible core disposed to pass through the center of said each receiver unit for supporting said receiver units while leaving a buffer zone between adjacent receiver units; means connected to said each receiver unit for producing a potential induced between the second pole of said one piezoelectric element and the first pole of said other piezoelectric element; a flexible tube containing the assembly of said receiver units and said flexible core, said flexible tube being filled with an insulating oil; and a plurality of buffer means each having an outer peripheral portion in contact with the inner surface of said flexible tube and a center portion fixed to said flexible core.

18. A cable according to claim 17, wherein each said buffer means comprises an elastic plate which is provided with a bearing at the center portion and a retaining ring at the outer peripheral portion, the bearing being in engagement with the flexible core and the retaining ring being in contact with the inner surface of said flexible tube.

19. A cable according to claim 17, wherein each said piezoelectric element is circular and has a thickness, is polarized in a direction of the thickness of the element and is adhered to a respective surface of a pair of surfaces of the connecting member so that the piezoelectric element layers have the same polarization direction.

20. A cable according to claim 17, wherein each said piezoelectric receiver unit comprises two cylindrical piezoelectric elements which are radially polarized, which have a different polarizing direction and which are coaxially disposed to be adhered to respective surfaces of a pair of surfaces of an insulating plate interposed therebetween and fixed to the flexible core, and each of said cylindrical piezoelectric elements is provided with an inner cylindrical electrode at its inner surface and an outer cylindrical electrode at its outer surface, the inner cylindrical electrode at one of the cylindrical piezoelectric elements being connected to the inner cylindrical electrode of the other cylindrical piezoelectric element via conductive means.

21. A cable according to claim 20 wherein each of said buffer means is provided with a peripheral edge portion in contact with the inner surface of said flexible tube, and said insulating oil is trapped between the respective buffer means.

22. A cable according to claim 17 wherein said flexible tube is a heat-shrinkable tube.

* * * * *